United States Patent
Han et al.

(10) Patent No.: US 10,804,571 B2
(45) Date of Patent: Oct. 13, 2020

(54) METHOD OF MANUFACTURING BATTERY CELL COMPRISING ELECTRODE HAVING APERTURE

(71) Applicant: LG Chem, Ltd., Daejeon (KR)

(72) Inventors: Hyun Gyu Han, Daejeon (KR); Ji Young Kim, Daejeon (KR); Dae Sik Choi, Daejeon (KR)

(73) Assignee: LG Chem, Ltd. (KR)

( * ) Notice: Subject to any disclaimer, the term of this patent is extended or adjusted under 35 U.S.C. 154(b) by 31 days.

(21) Appl. No.: 15/817,956

(22) Filed: Nov. 20, 2017

(65) Prior Publication Data
US 2018/0145373 A1    May 24, 2018

(51) Int. Cl.
| | |
|---|---|
| *H01M 10/0585* | (2010.01) |
| *H01M 4/04* | (2006.01) |
| *H01M 2/26* | (2006.01) |
| *H01M 4/02* | (2006.01) |

(52) U.S. Cl.
CPC ......... *H01M 10/0585* (2013.01); *H01M 2/26* (2013.01); *H01M 4/04* (2013.01); *H01M 2004/021* (2013.01)

(58) Field of Classification Search
CPC ....... H01M 10/0585; H01M 2004/021; H01M 2/26; H01M 4/04
See application file for complete search history.

(56) References Cited

U.S. PATENT DOCUMENTS

| | | | |
|---|---|---|---|
| 9,847,531 B2 * | 12/2017 | Abdelmalak | H01M 4/70 |
| 2011/0281143 A1 * | 11/2011 | He | H01M 4/13 |
| | | | 429/7 |
| 2013/0000458 A1 * | 1/2013 | Ueda | B26D 7/018 |
| | | | 83/367 |
| 2014/0106193 A1 * | 4/2014 | Kim | H01M 2/22 |
| | | | 429/94 |
| 2014/0212751 A1 * | 7/2014 | Ku | H01M 10/0585 |
| | | | 429/211 |

(Continued)

FOREIGN PATENT DOCUMENTS

| | | |
|---|---|---|
| JP | 2012-174959 A | 9/2012 |
| KR | 2013-0055712 A | 5/2013 |

(Continued)

*Primary Examiner* — Basia A Ridley
*Assistant Examiner* — Heng M. Chan
(74) *Attorney, Agent, or Firm* — Lerner, David, Littenberg, Krumholz & Mentlik, LLP (57) ABSTRACT

A method of manufacturing a battery cell is provided. The battery cell has an electrode assembly with a plurality of unit cells that a cathode plate and an anode plate coupled to a separator. A separation sheet or a separator is interposed therebetween. The method includes applying an electrode active material a side of a current collector to manufacture a cathode plate and an anode plate and forming an electrode tab by notching the uncoated portion of the exterior periphery the current collector in the cathode plate and the anode plate where an electrode active material is not coated while forming an aperture. The aperture penetrates through an active material coating layer and the current collector in the coated portion. The method further includes coupling the cathode plate and the anode plate to a separator at a position to allow communication of the apertures to manufacture a unit cell.

15 Claims, 5 Drawing Sheets

(56) References Cited

U.S. PATENT DOCUMENTS

| | | | | |
|---|---|---|---|---|
| 2014/0255778 | A1* | 9/2014 | Huh | H01M 4/0404 |
| | | | | 429/211 |
| 2015/0044536 | A1* | 2/2015 | Kwon | H01M 2/0207 |
| | | | | 429/94 |
| 2015/0140400 | A1* | 5/2015 | Yamazaki | H01M 10/0585 |
| | | | | 429/136 |
| 2017/0047559 | A1 | 2/2017 | Yoo et al. | |
| 2017/0155155 | A1* | 6/2017 | Abdelmalak | H01M 4/70 |

FOREIGN PATENT DOCUMENTS

| | | |
|---|---|---|
| KR | 10-2015-0099896 A | 9/2015 |
| KR | 2016-0004737 A | 1/2016 |
| KR | 10-2016-0050403 A | 5/2016 |
| KR | 2016-0066215 A | 6/2016 |
| KR | 10-2016-0095740 A | 8/2016 |

\* cited by examiner

METHOD OF MANUFACTURING BATTERY CELL COMPRISING ELECTRODE HAVING APERTURE

CROSS-REFERENCE TO RELATED APPLICATION

This application claims priority to and the benefit of Korean Patent Application No. 10-2016-0157075, filed on Nov. 24, 2016, the disclosure of which is incorporated herein by reference in its entirety.

TECHNICAL FIELD

The present disclosure relates to a method of manufacturing a battery cell comprising an electrode having an aperture, and more particularly, to improving the electrolyte impregnation of an electrode assembly by forming a aperture in an electrode plate during the notching process for forming an electrode tab in the manufacture of a battery cell.

RELATED ART

Recently, due to the rapid increase in use of fossil fuels, demand for alternative energy or clean energy has increased. Thus, the field of power generation and electricity storage that uses electrochemical reaction has been actively studied. Secondary batteries are currently used as a representative example of electrochemical devices using electrochemical energy, and the use thereof is increasingly expanding. As technologies for portable devices, (e.g., portable computers, portable phones, cameras, etc.) continue to develop and demand continues to increase, demand for secondary batteries as energy sources is rapidly increasing. Among these secondary batteries, extensive research has been conducted on lithium secondary batteries which have a high charge and discharge capacity and an extended cycle lifespan and which is eco-friendly. Lithium secondary batteries as described are commercially available and widely used.

Secondary batteries are classified based on the structure of an electrode assembly composed of a cathode, an anode and a separator. For example, the electrode assembly may be configured to have a layer spiral arrangement (e.g., jelly-roll wound) type structure in which long sheet type cathodes and long sheet type anodes are wound to include separators disposed respectively between the cathodes and the anodes, a stacked type structure in which pluralities of cathodes and anodes each having a predetermined size are sequentially stacked when separators are disposed respectively between the cathodes and the anodes, or a stacked/folded type structure in which bi-cells or full cells, in each of which cathodes and anodes each having a predetermined size are stacked when separators are disposed respectively, between the cathodes and the anodes, are wound. In particular, extensive research has been conducted in a pouch-shaped battery that have a structure with a stacked or stacked/folded type electrode assembly mounted in a pouch-shaped battery case formed from an aluminum laminate sheet because of low manufacturing costs, light weight and easy modification in shape. Accordingly, the use of pouch-shaped batteries has gradually increased.

However, in secondary batteries, an electrode assembly is disposed in a battery case together with an electrolyte, and improves electrical performance when sufficiently impregnated with and wetted by the electrolyte. For example, during impregnation with the electrolyte, it is difficult to uniformly wet the entire area of the electrode assembly including the central part due to the size, stacked structure, etc. of the electrode assembly. Accordingly, a uniform electrode reaction does not occur over the entire area of the electrode during charging and discharging cycles. Further, when an electrode and a separator are brought into close contact with each other during the manufacture of a unit cell, gas is trapped between the electrode and the separator to cause an unfilled region inside the cell, resulting in deterioration of the performance of the battery. Accordingly, a non-uniform cell thickness and separation of an electrode result in a compromised appearance of the cell and a reduction in safety of the battery.

In order to solve these problems, a technology of forming an aperture in an electrode assembly to induce electrolyte impregnation via the aperture has been proposed. However, to form an aperture, a separate aperture forming process is required, which increases the complexity of the manufacturing process and reduces the production yield. Further, production cost is increased because it is necessary to provide separate equipment for performing the aperture forming process. Therefore, there is a significant demand for a technology capable of fundamentally solving the above mentioned problems.

The contents described as the related art have been provided merely for assisting in the understanding for the background of the present disclosure and should not be considered as corresponding to the related art known to those skilled in the art.

SUMMARY

The present disclosure provides, an aperture penetrating through an active material coating layer and a current collector is formed in a coated portion coated with an electrode active material in the process of forming an electrode tab by notching an electrode plate during the manufacture of a battery cell. The manufacturing process is simplified and the production cost is reduced while improving the electrolyte impregnation of a secondary battery and the problem of the trapping of gas inside the battery.

In an aspect of an exemplary embodiment of the present disclosure a method of manufacturing a battery cell comprising an electrode assembly having a plurality of unit cells, each of which have a structure in which a cathode plate and an anode plate are coupled to a separator, and a separation sheet or a separator interposed therebetween may include applying an electrode active material to one or both sides of a current collector to manufacture a cathode plate and an anode plate, forming an electrode tab by notching the uncoated portion of the exterior periphery the current collector in the cathode plate and the anode plate, where an electrode active material is not coated, while forming an aperture, which penetrates through an active material coating layer and the current collector, in the coated portion coated with an electrode active material and coupling the cathode plate and the anode plate to a separator at a position to allow communication of the apertures to manufacture a unit cell.

In some exemplary embodiments, the electrode assembly may be a stacked/folded type electrode assembly having a structure in which a plurality of unit cells are wound by a separation sheet. The electrode assembly may be a lamination/stacked type electrode assembly having a structure in which a plurality of unit cells are stacked with a separator interposed therebetween.

In other exemplary embodiments, the unit cell may be a bi-cell having the electrode plates disposed on both exterior sides that include electrode plates having the same polarity. Additionally, the unit cell may be a full cell having the electrode plates disposed on both exterior sides that include electrode plates having opposite polarities.

In some exemplary embodiments, the cathode plate and the anode plate may include a first aperture punched at the center of the active material coating layer. The cathode plate and the anode plate each may include a plurality of second apertures at symmetrical positions about the first aperture. In particular, the cathode plate and the anode plate each may include a plurality of second apertures that are formed in radially symmetrical positions about the first aperture.

The method of manufacturing may include the aperture having a circular shape, an elliptical shape, or a polygonal shape. The method of manufacturing a battery cell may include the size of the aperture of the anode plate at a position allowing the communication to be greater than the size of the aperture of the cathode plate.

In another exemplary embodiment, the method of manufacturing a battery cell may include the area of the aperture of the anode plate to be about 101% to 200% of the area of the aperture of the cathode plate. The method of manufacturing a battery cell may include the inner periphery of the aperture of the cathode plate disposed on the exterior of the inner periphery of the aperture of the anode plate, without overlapping with the inner periphery of the aperture of the anode plate. In other exemplary embodiments, the method of manufacturing a battery cell may include the center of the aperture of the anode plate disposed on the same axis as the center of the aperture of the cathode plate.

The method of manufacturing a battery cell may include the cathode plate and the anode plate each having a plurality of apertures and the total area of the apertures is about 0.1 to 1% of the total area of the active material coating layer. The method of manufacturing a battery cell may include the separator being an organic/inorganic complex porous safety-reinforcing separator (SRS).

In an aspect of an exemplary embodiment of the present disclosure, a device may include at least one battery cell manufactured as disclosed above. In some exemplary embodiments, the device may be is any one selected from the group consisting of a mobile phone, a tablet computer, a notebook computer, a power tool, a wearable electronic device, an electric vehicle, a hybrid electric vehicle, a plug-in hybrid electric vehicle, and a power storage device.

BRIEF DESCRIPTION OF THE DRAWINGS

The following drawings attached to the specification illustrate exemplary examples of the present disclosure, and serve to enable technical concepts of the present disclosure to be further understood together with detailed description of the disclosure given below, and therefore the present disclosure should not be interpreted only with matters in such drawings.

DETAILED DESCRIPTION

Hereinafter, embodiments of the present disclosure will be described with reference to the accompanying drawings. However, the description provided herein is for better understanding of the present disclosure, and the scope of the present disclosure is not limited thereto. In describing the exemplary embodiments, thicknesses of lines and dimension of components shown in the drawings may be expressed exaggeratedly for clarity and convenience of description. In addition, terms to be described below are those defined in consideration of functions in the present disclosure, which may vary depending on intention or custom of users or operators. Therefore, definition of these terms should be made based on the contents throughout this specification.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is understood that the term "vehicle" or "vehicular" or other similar term as used herein is inclusive of motor vehicle in general such as passenger automobiles including sports utility vehicles (SUV), buses, trucks, various commercial vehicles, watercraft including a variety of boats, ships, aircraft, and the like and includes hybrid vehicles, electric vehicles, combustion, plug-in hybrid electric vehicles, hydrogen-powered vehicles and other alternative fuel vehicles (e.g. fuels derived from resources other than petroleum).

Conventionally, it is common to perform a punching process using a separate punching equipment to form an aperture in an electrode assembly or an electrode. In particular, the punching process is challenging to perform after moving an electrode having an active material layer formed therein to the punching equipment, resulting in a time increase and cost increase during the manufacturing process. However, according to the an exemplary embodiment of present disclosure, the manufacturing method of forming a aperture in an electrode assembly may be improved by forming an aperture, which penetrates through a coating layer and a current collector in a coated portion coated with an electrode active material during a notching process for forming an electrode tab in an electrode plate during the manufacture of a battery cell.

Generally, a process of manufacturing an electrode assembly that includes a stacked structure of unit electrodes may include a process of manufacturing a cathode mixture and an anode mixture, a process of manufacturing electrodes in the form of sheet composed of a cathode and an anode by applying a respective mixture to a cathode current collector and an anode current collector, a process of forming an electrode tab on the electrodes, a process of pressing the electrodes, a process of slitting the electrodes to a desired size to manufacture electrodes, a vacuum drying process, and a process of forming an electrode assembly composed of the resultant electrodes, which are a cathode and an anode, and a separator.

A process of machining along a desired tab region proximate to an end of an electrode with a device capable of cutting during the process of forming an electrode tab may be referred to as a notching process. Specifically, a notching process may be performed using a device configured to cut an electrode with a cavity capable of moving in a vertical direction (e.g., up and down), in which, specifically a notching pattern of a specific shape may be formed within the cavity to allow to press and cut a portion excluding the desired tap region, and which cuts a part of an end of an electrode based on the notching pattern when the cavity is lowered. A remaining portion after cutting which protrudes from the end of the electrode may be used as an electrode tab.

Figure 1:
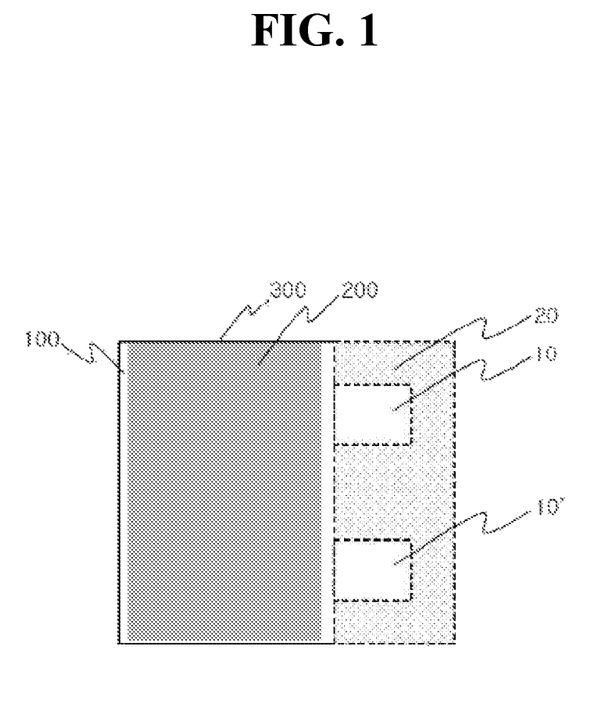
FIG. 1 is an exemplary schematic view of conventional electrode notching.

FIG. 1 is an exemplary plan view showing a notching pattern in a conventional notching process. FIG. 1 shows a region on which notching is performed to form an electrode tab 10, 10' on an uncoated portion of the exterior periphery of a current collector 100 in an electrode plate 300 where an electrode active material is not coated. When the cavity is lowered pressure may be applied to the portion 20 that excludes the intended tab region 10, 10' to form an electrode tab.

In the notching device of the present disclosure, a notching pattern may be formed in the cavity to engage and cut the portion 20 excluding the desired tab region and the desired position of an aperture to be formed in the electrode plate. When the cavity is lowered, the portion excluding the electrode tab region may be cut from the uncoated portion of the exterior periphery of the current collector, where an electrode active material is not coated based on the notching pattern. Additionally, at the same time an aperture may be formed in the active material coating layer and the current collector in the coated portion coated with an electrode active material.

The number of the apertures does not matter. However, in an exemplary embodiment, a cathode plate and an anode plate may include a first aperture punched at the center of the active material coating layer. Additionally, a cathode plate and an anode plate each may include in addition to the first aperture, a plurality (e.g., at least two) of second apertures at symmetrical positions about the first aperture. For example, when the electrode plates each include a plurality of apertures, the total area of the apertures may be about 0.1 to 1% of the total area of the active material coating layer.

However, the number of the apertures may be the same between the cathode plate and the anode plate, and the cathode plate and the anode plate may be coupled to a separator to provide the apertures with communication between each other to form a unit cell. When the aperture of the cathode plate and the aperture of the anode plate are coupled to each other at a position that provide communication with each other, an improved electrolyte impregnation may be achieved and may be advantageous in manufacturing cost and process planning the apertures in the cathode plate and the anode plate may be formed using the same notching device.

The unit cells of the battery cell manufactured according to the present disclosure are unit cells that may include an electrode plate having an aperture coupled to a separator without an aperture. The unit cell may prevent cathodes and anodes from directly contacting with each other at an aperture forming region, thus may prevent the internal short-circuit of the battery cell and the fire resulting therefrom. The unit cell may be a bi-cell in which the electrode plates disposed on both exterior sides consist of electrode plates having the same polarity or a full cell in which the electrode plates disposed on both exterior sides form electrode plates having opposite polarities.

The shape of the aperture is not particularly limited, but it may have a circular shape, an elliptical shape, or a polygonal shape, etc. The aperture of a cathode plate and the aperture of an anode plate do not necessarily have to have the same shape because a separator is disposed at a position where the apertures communicate with each other. However, in some exemplary embodiments, aperture of a cathode plate and the aperture of an anode plate may have the same shape, to provide a smooth flow of an electrolyte therebetween.

Regarding the size of the aperture of an electrode plate, the size of the aperture of a cathode plate may be greater than the size of the aperture of an anode plate. Specifically, the area of the aperture of a cathode plate may be about 101% to 200%, preferably 105% to 150% of the area of an anode plate aperture.

In the present disclosure, since the size of the aperture of a cathode plate is greater than the size of the aperture of an anode plate, the inner periphery of the aperture of a cathode plate may be disposed on the exterior of the inner periphery of the aperture of an anode plate, without overlapping with the inner periphery of the aperture of the anode plate. Although a separator may be interposed between the apertures, this configuration is added to secure the safety of the battery such as prevention of the occurrence of fire due to contact between a cathode plate and an anode plate when a separator in the aperture portion is torn due to an external impact against the battery. Specifically, the center of an anode plate aperture may be disposed on the same axis as the center of a cathode plate aperture. Additionally, cathode plate apertures and anode plate apertures do not necessarily have to be disposed in symmetrical positions in the respective electrode plate. As long as the apertures in a cathode plate are disposed at positions allowing communication with the apertures of an anode plate, the apertures in an electrode do not necessarily have to be formed in symmetrical positions.

In particular, the electrode assembly included in the battery cell of the present disclosure may be a stacked/folded type electrode assembly having a structure in which a plurality of unit cells are wound by a separation sheet. In another exemplary embodiment, the electrode assembly may be a lamination/stacked type electrode assembly having a structure in which a plurality of unit cells are stacked with a separator interposed therebetween. The unit cell may be manufactured by applying a cathode/anode active material to a cathode/anode current collector to form a coated portion, manufacturing a cathode plate and an anode plate, which have an electrode tab and a aperture formed in the respective electrode plate, using a notching device, and then coupling the cathode plate and the anode plate to a separator without a aperture. The type of the separator is not limited, but it may be an organic/inorganic complex porous safety-reinforcing separator (SRS).

In the present disclosure, an anode active material generally used in lithium secondary batteries may be used as the anode active material, without limitation. Examples thereof may include carbonaceous materials such as hard carbon and graphite-based carbon; metal complex oxides such as $Li_xFe_2O_3(0≤x≤1)$, $Li_xWO_2(0≤x≤1)$, $Sn_xMe_{1-x}Me'_yO_z$(Me: Mn, Fe, Pb, Ge; Me': Al, B, P, Si, Group 1, Group 2, or Group 3 elements of the periodic table, halogen; $0<x≤1$; $1≤y≤3$; $1≤z≤8$); lithium metal; lithium alloy; silicon-based alloy; tin-based alloy; metal oxides such as $SnO$, $SnO_2$, $PbO$, $PbO_2$, $Pb_2O_3$, $Pb_3O_4$, $Sb_2O_3$, $Sb_2O_4$, $Sb_2O_5$, $GeO$, $GeO_2$, $Bi_2O_3$, $Bi_2O_4$, and $Bi_2O_5$; conductive polymers such as polyacetylene; and Li—Co—Ni-based materials.

However, not all of the anode active materials exhibit the same effect. Among the anode active materials, carbonaceous materials may exhibit the preferred effects. Specifically, the carbonaceous materials may be at least one selected from the group consisting of graphite-based carbon, coke-based carbon, soft carbon, and hard carbon. Such natural graphite may be made into a spherical shape by pulverizing and granulating scaly natural graphite raw materials. The resultant spherical natural graphite has a minimized specific surface area, thus capable of reducing the decomposition reaction of an electrolyte on the surface of the active material. Therefore, when the spherical granulated natural graphite is used in combination with scaly natural graphite, the packing density of the electrode may be increased and the energy density can be improved. In particular, the anode active material may be natural graphite, artificial graphite, or natural graphite and artificial graphite.

According to the present disclosure, examples of the cathode active material include, but are not limited to, layered compounds such as lithium cobalt oxides ($LiCoO_2$) and lithium nickel oxides ($LiNiO_2$) or compounds substituted with one or more transition metals; lithium manganese oxides such as the formula $Li_{1+x}Mn_{2-x}O_4$ where x is 0 to 0.33, $LiMnO_3$, $LiMn_2O_3$, and $LiMnO_2$; lithium copper oxides ($Li_2CuO_2$); vanadium oxides such as $LiV_3O_8$, $LiV_3O_4$, $V_2O_5$, and $Cu_2V_2O_7$; Ni-site type lithium nickel oxides represented by the formula $LiNi_{1-x}M_xO_2$ where M=Co, Mn, Al, Cu, Fe, Mg, B or Ga and x=0.01 to 0.3; lithium manganese complex oxides represented by the formula $LiMn_{2-x}M_xO_2$ where M=Co, Ni, Fe, Cr, Zn or Ta and x=0.01 to 0.1 or $Li_2Mn_3MO_8$ where M=Fe, Co, Ni, Cu or Zn; $LiMn_2O_4$ in which a part of Li may be substituted with an alkaline earth metal ion; disulfide compounds; $Fe_2(MoO_4)_3$.

The present disclosure also provides a device that may include battery cell manufactured according to the method of manufacturing a battery cell of the present disclosure. Specifically, the device may be any one selected from the group consisting of a mobile phone, a tablet computer, a notebook computer, a power tool, a wearable electronic device, an electric vehicle, a hybrid electric vehicle, a plug-in hybrid electric vehicle, and a power storage device. Since the structure and manufacturing method of the devices are well known in the art, a detailed description thereof will be omitted herein.

Hereinafter, embodiments of the present disclosure will be described with reference to the drawings. However, these exemplary embodiments are provided to facilitate understanding of the present disclosure and the scope of the present disclosure is not limited thereto. General notching devices may include a cavity (not shown) configured to move in the vertical direction (e.g., moves up and down). In a notching process, when the cavity is lowered, notching may be performed on the portion 20 excluding the desired tab region 10, 10', as shown in FIG. 1.

Figure 2:
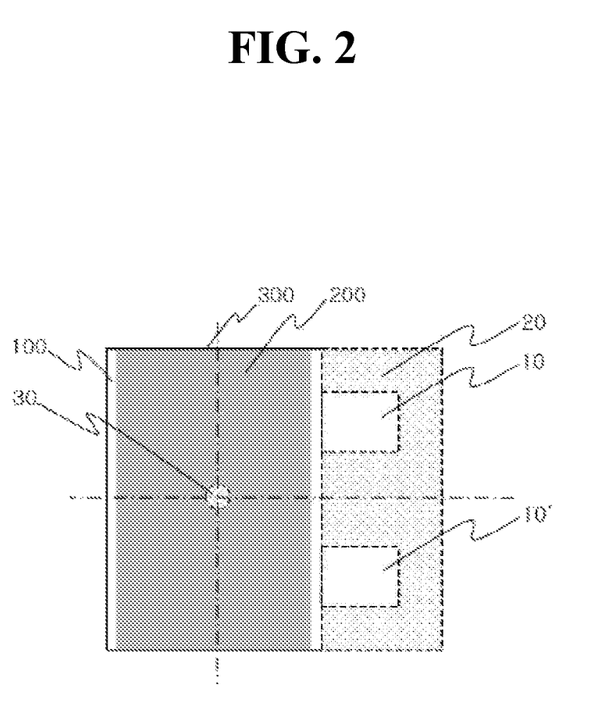
FIG. 2 is an exemplary plan view showing notching for forming an aperture according to an exemplary embodiment of the present disclosure.

FIG. 2 is an exemplary plan view showing notching for forming an aperture according to an exemplary embodiment of the present disclosure. According to an exemplary embodiment, a first aperture may be formed by notching a first aperture forming region 30 positioned on the coated portion 200 of an electrode plate 300 using a notching device in which the inside of the cavity may be formed to perform notching as shown in FIG. 2. At this time, the active material coating layer and the current collector constituting the coated portion may be perforated together to form an aperture.

Figure 3:
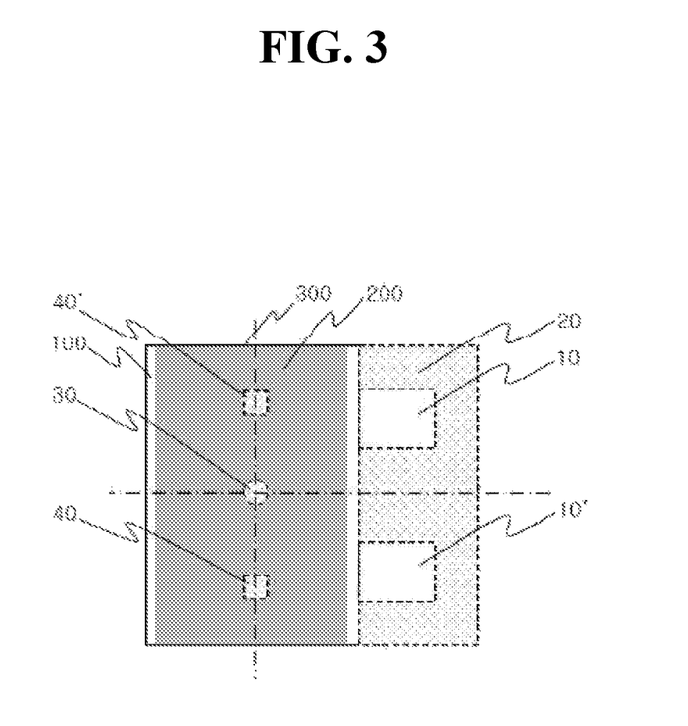
FIG. 3 is an exemplary schematic view showing notching for forming an aperture according to an exemplary embodiment of the present disclosure.

FIG. 3 is an exemplary schematic view showing notching for forming an aperture according to another exemplary embodiment of the present disclosure. In addition to the first aperture forming region 30 shown in FIG. 2, FIG. 3 shows second aperture forming regions 40 and 40' disposed symmetrically with respect to the imaginary line passing through the first aperture forming region 30 between the two desired tab regions 10 and 10'. The shape of each aperture 40, 40' in the same electrode or in different electrodes may be different, but the aperture 321 of the anode plate and the aperture 311 of the cathode plate may be coupled to a separator 400 at a position allowing communication between them (see FIG. 4).

Figure 4:
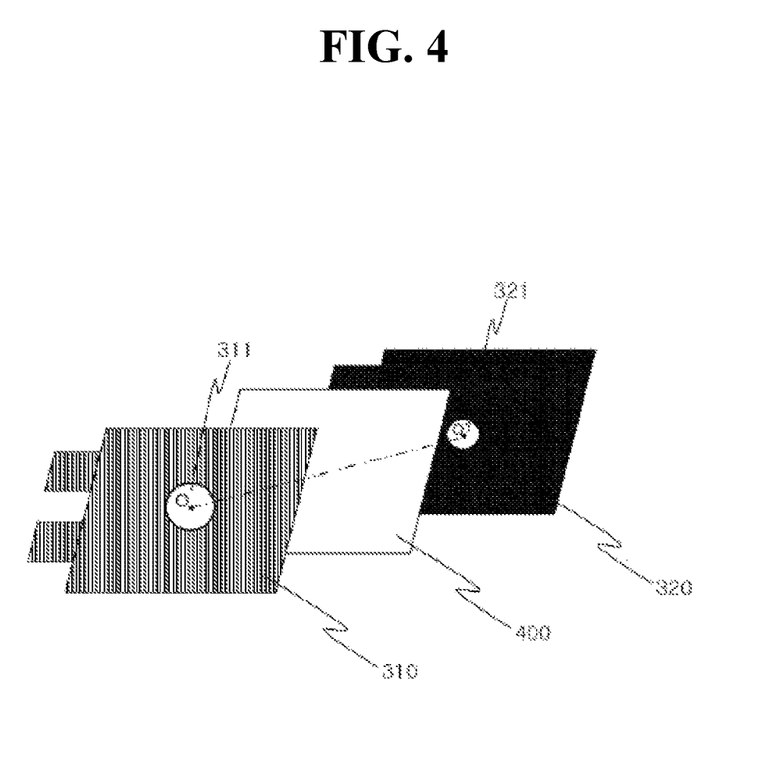
FIG. 4 is an exemplary schematic view illustrating a stacked structure of unit cells constituting an electrode assembly according to an exemplary embodiment of the present disclosure.

FIG. 4 is an exemplary schematic view illustrating a stacked structure of a cathode plate 310 and an anode plate 320, which comprise apertures 311 and 321, respectively and a separator 400 interposed between the two electrode plates and without an aperture. The aperture 311 of the cathode plate 310 may be greater in size than the aperture 321 of the anode plate 320. The centers O and O' of the apertures may be disposed on the same axis, and the inner periphery of the aperture 311 of the cathode plate 310 may be disposed external to the inner periphery of the aperture of the anode plate without overlapping with the inner periphery of the aperture of the anode plate. However, the positions of the apertures are not limited to the positions of the apertures shown in FIG. 3 and FIG. 4, and the positions of the apertures do not necessarily have to be symmetrical in an electrode plate.

Figure 5:
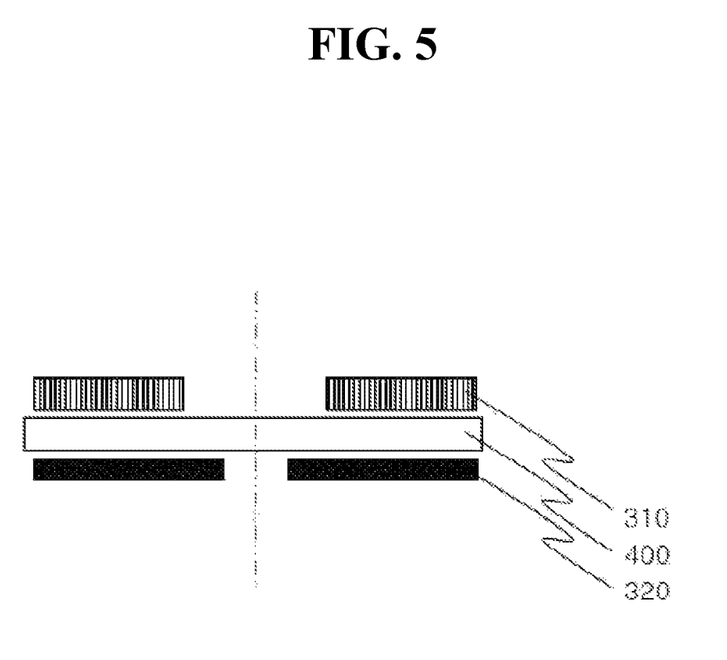
FIG. 5 is an exemplary vertical cross-sectional view illustrating a stacked structure of unit cells cut along the line O-O' in FIG. 4 according to an exemplary embodiment of the present disclosure.

FIG. 5 is an exemplary vertical cross-sectional view illustrating a stacked structure of a unit cell cut along the line O-O' extending from the center of the aperture of each electrode plate of FIG. 4. As described above, the size of the aperture 311 of the cathode plate 310 may be greater than the size of the aperture 321 of the anode plate 320, and the separator 400, interposed between the electrode plates comprising an aperture, does not form an aperture. In the electrode assemblies that forms a general unit cell or a plurality of unit cells, an electrolyte may flow from the end portion of an electrode plate toward the center portion of the electrode plate. However, in the electrode assembly according to an exemplary embodiment, an electrolyte may flow into the center of the electrode plate through the aperture formed in the electrode plate, which may significantly improve electrolyte impregnation. In addition, since gas is discharged through the aperture, the battery safety and battery defect rate generated by the gas trapped between an electrode and a separator may be improved.

As described above, the method of manufacturing a battery cell according to the present disclosure may improve the electrolyte impregnation of an electrode assembly by forming an aperture in an electrode plate during the notching process for forming an electrode tab in the manufacture of a battery cell. Further, this method may simplify the battery cell manufacturing process and may reduce the manufacturing cost since a conventional battery cell manufacturing method is used without a separate process to form an aperture.

In addition, according to an exemplary embodiment, a separator may be disposed at a portion where the apertures of a cathode plate and an anode plate communicate with each other to prevent contact between the cathode and the anode and prevent trapping of gas between an electrode and the separator, which may improve the safety of the battery cell and the appearance defect rate of the battery.

While the present disclosure has been described with respect to the exemplary embodiments, it will be understood that those skilled in the art may make various changes and modifications without departing from the spirit and scope of the disclosure.

What is claimed is:

1. A method of manufacturing a battery cell that includes an electrode assembly having a plurality of unit cells, each of which has a structure with a cathode plate and an anode plate each coupled to a separator, and a separation sheet or the separator is interposed therebetween, comprising:
    applying an electrode active material to a side of a current collector to form each of the cathode plate and the anode plate;
    forming an electrode tab by notching the current collector only in an uncoated portion of an exterior periphery in each of the cathode plate and the anode plate, where the electrode active material is not coated, so as to remove a part of the exterior periphery that excludes the electrode tab, while punching an aperture which penetrates through an active material coating layer and the current collector in a coated portion that is coated with the electrode active material; and
    coupling the cathode plate and the anode plate to the separator at a position allowing communication of the aperture of the cathode plate with the aperture of the anode plate to manufacture each unit cell of the plurality of units cells.

2. The method of manufacturing a battery cell according to claim 1, wherein the electrode assembly is a stacked/folded type electrode assembly having a structure in which the plurality of unit cells are wound by the separation sheet.

3. The method of manufacturing a battery cell according to claim 1, wherein the electrode assembly is a lamination/stacked type electrode assembly having a structure in which the plurality of unit cells are stacked with the separator interposed therebetween.

4. The method of manufacturing a battery cell according to claim 1, wherein the each unit cell is a bi-cell in which electrode plates of the same polarity are disposed on both exterior sides of the each unit cell.

5. The method of manufacturing a battery cell according to claim 1, wherein the each unit cell is a full cell in which electrode plates of opposite polarities are disposed on both exterior sides of the each unit cell.

6. The method of manufacturing a battery cell according to claim 1, wherein the cathode plate and the anode plate comprise:
    a first aperture punched at the center of the active material coating layer.

7. The method of manufacturing a battery cell according to claim 6, wherein the cathode plate and the anode plate each comprise:
    a plurality of second apertures at symmetrical positions about the first aperture.

8. The method of manufacturing a battery cell according to claim 6, wherein the cathode plate and the anode plate each comprise:
    a plurality of second apertures that are formed in radially symmetrical positions about the first aperture.

9. The method of manufacturing a battery cell according to claim 1, wherein the aperture has a circular shape, an elliptical shape, or a polygonal shape.

10. The method of manufacturing a battery cell according to claim 1, wherein the size of the aperture of the cathode plate at a position allowing the communication is greater than the size of the aperture of the anode plate.

11. The method of manufacturing a battery cell according to claim 10, wherein the area of the aperture of the cathode plate is about 101% to 200% of the area of the aperture of the anode plate.

12. The method of manufacturing a battery cell according to claim 10, wherein an inner periphery of the aperture of the cathode plate is disposed on an exterior of an inner periphery of the aperture of the anode plate, without overlapping with the inner periphery of the aperture of the anode plate.

13. The method of manufacturing a battery cell according to claim 10, wherein the center of the aperture of the anode plate is disposed on the same axis as the center of the aperture of the cathode plate.

14. The method of manufacturing a battery cell according to claim 1, wherein the cathode plate and the anode plate each have a plurality of apertures, and the total area of the apertures is about 0.1 to 1% of the total area of the active material coating layer.

15. The method of manufacturing a battery cell according to claim 1, wherein the separator is an organic and inorganic complex porous safety-reinforcing separator (SRS).

* * * * *

UNITED STATES PATENT AND TRADEMARK OFFICE
CERTIFICATE OF CORRECTION

PATENT NO. : 10,804,571 B2
APPLICATION NO. : 15/817956
DATED : October 13, 2020
INVENTOR(S) : Hyun Gyu Han, Ji Young Kim and Dae Sik Choi Page 1 of 1

It is certified that error appears in the above-identified patent and that said Letters Patent is hereby corrected as shown below:

On the Title Page

Please insert the following:
--(30) Foreign Application Priority Data
November 24, 2016 (KR) . . . . . . . . . . . 10-2016-0157075--

Signed and Sealed this
Twenty-fourth Day of November, 2020

Andrei Iancu
*Director of the United States Patent and Trademark Office*